United States Patent [19]

MacLeay

[11] 3,992,368
[45] Nov. 16, 1976

[54] OXIDATION PROCESS FOR PREPARING α-HYDROXYAZO COMPOUNDS

[75] Inventor: Ronald Edward MacLeay, Williamsville, N.Y.

[73] Assignee: Pennwalt Corporation, Philadelphia, Pa.

[22] Filed: Mar. 21, 1974

[21] Appl. No.: 453,450

[52] U.S. Cl. .............................. 260/192; 260/566 B
[51] Int. Cl.² ...................................... C07C 107/02
[58] Field of Search ...................................... 260/192

[56] References Cited
UNITED STATES PATENTS 3,350,385  10/1967  Spialter et al. ...................... 260/192

OTHER PUBLICATIONS

Morrison, H., Danishefsky S., Yates P., J. Org. Chem., vol. 26, pp. 2617–2618, (1961).
Ioffe B., Stopskii V., J. Org. Chem., USSR, vol. 4, pp. 1446–1461, (1968).
Ioffe B., Gershtein L., J. Org. Chem., USSR, vol. 5, pp. 257–260, (1969).

*Primary Examiner*—Floyd D. Higel
*Assistant Examiner*—John J. Doll

[57] ABSTRACT

A process for preparing an alpha-hydroxyazoalkane of the formula

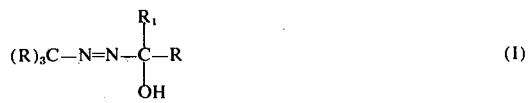

wherein R is hydrogen, aliphatic, cycloaliphatic or aromatic and $R_1$ and $R_2$ are monovalent aliphatic radicals and $R_2$ can also be aromatic with the proviso that no more than one R is hydrogen or aromatic by oxidizing a hydrazone of the formula

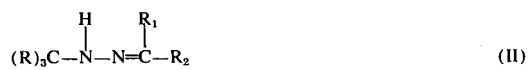

with a non-acidic, aqueous mild oxidizing solution. Generally, the mild oxidizing agent comprises an aqueous solution of a hypohalite or an alkali metal or alkaline earth metal, preferably sodium hypochlorite. The mole ratio of oxidizing agent to hydrazone should be at least 1:1 to ensure complete oxidation, and preferably one uses a 5% to 15% molar excess of the oxidizing agent.

5 Claims, No Drawings

OXIDATION PROCESS FOR PREPARING α-HYDROXYAZO COMPOUNDS

THE PRIOR ART

Similar compounds where $R_1$ is hydrogen has been made by S. Hunig and G. Buttner from t-butyldiazenes and aldehydes (Angew. Chemie Int. Ed. 8, 451, 1969) and alkoxydiazenium salts and the hydroxide ion (Ber, 104, 1088, 1971). The compounds of the present invention cannot be made by these prior art processes.

A process for forming appropriate hydrazones for use as starting materials in the process of the present invention can be found in British 1,291,317 dated Oct. 4, 1972.

Statement Of Invention

This invention relates to a process for making an alpha-hydroxyazoalkane of formula (I) which comprises oxidizing a hydrazone of formula (II) preferably with a neutral or basic hypohalite solution. The reaction can be expressed by the equation:

$$(II) + M(OZ)_n \rightarrow (I) + MZ_n$$

where M is alkali metal or alkaline earth metal, Z is chlorine or bromine and $n$ is 1 or 2. The preferred hypohalite solution is an aqueous hypochlorite solution.

THE EXAMPLES

The invention will be more readily understood by reference to the Examples which are intended merely to illustrate the invention and not to limit it in any manner.

EXAMPLE 1

Preparation of 2-t-Butylazo-2-Hydroxy-4-Methylpentane

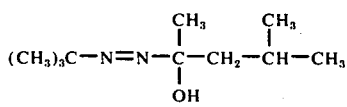

To 34 grams (0.2 moles) of the t-butylhydrazone of methyl isobutyl ketone cooled to 6° C. in a 500 ml round bottom flask is added 0.3 moles of NaOCl solution (prepared from 225 grams of ice, 48 grams of 50% NaOH and 21.4 grams of chlorine). The NaOCl solution is added slowly from a dropping funnel holding the reaction temperature at 6°–8° C. with an ice bath. After the addition, the reaction mass is stirred 1 hour at 6° C. to complete the reaction (according to vapor phase chromatography). The organic layer is separated, washed with cold saturated sodium chloride solution, dried over anhydrous sodium sulfate and filtered to leave 30.7 grams (83% yield) of a yellow liquid. An infrared spectrum is used to confirm the identity of the product.

EXAMPLE 2

Preparation of 2-t-Butylazo-2-Hydroxypropane

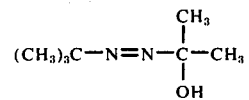

To a solution of 512 grams (4.0 moles) of acetone t-butyl-hydrazone in 600 mls of pentane, cooled to 10° C. in a 5 liter jacketed reactor equipped with a bottom outlet, mechanical stirrer and thermometer, is added 4 moles of NaOCl solution (prepared from 2000 grams of ice, 640 grams of 50% NaOH and 284 grams of chlorine). The NaOCl solution is added slowly from a dropping funnel holding the reaction temperature at 15°–20° C. by circulating ice water through the reactor jacket. A VPC scan is run after each mole of NaOCl is added. After 2 moles of NaOCl are added, the aqueous layer is drained out of the reactor. The last 2 moles of NaOCl are then added in the same manner. Approximately ½ hour is required to add 1 mole of NaOCl. Vapor phase chromatography indicates the reaction is essentially complete at the end of the NaOCl addition. The reaction is stirred an additional 15 minutes, the pentane solution separated, washed with 1500 mls of cold water, dried over anhydrous sodium sulfate, filtered and the pentane removed under reduced pressure to leave 500 grams (87% yield) of a light yellow liquid. The infrared spectrum and NMR spectrum indicate the desired product.

EXAMPLE 3

Preparation of 1-t-Butylazo-1-Hydroxycyclohexane

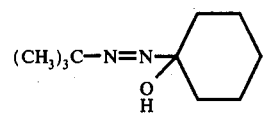

To a solution of 16.8 grams (0.1 moles) of cyclohexanone t-butylhydrazone in 50 ml of pentane in a 500 ml 4 neck round bottom flask is added 0.15 moles of NaOCl solution (prepared from 125 grams of ice, 24.0 grams of 50% NaOH and 10.5 grams of chlorine). The NaOCl solution is added from a dropping funnel over 15 minutes, holding the reaction temperature at 25°–28° C. After the addition is complete, it requires 1½ hours stirring time at 25° C. before vapor phase chromatography indicates the reaction to be complete. The pentane solution is separated, washed with ice cold water, dried over anhydrous sodium sulfate, filtered and the pentane removed under reduced pressure to leave 18.4 grams (100% yield) of a yellow liquid. The infrared spectrum of the product is in agreement with the structure of 1(-t-butylazo)-1-hyroxycyclohexane.

EXAMPLE 4

Preparation of 2-t-Butylazo-2-Hydroxybutane

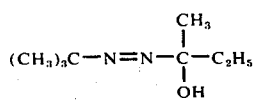

To a jacketed 3 liter reactor equipped with a mechanical stirrer, thermometer, condenser, dropping funnel and nitrogen atmosphere is added 106.5 grams (0.75 moles) of methyl ethyl ketone t-butylhydrazone. With rapid agitation and cold water circulating through the reactor jacket, approximately 575 mls (about 0.825 moles) of commercial sodium hypochlorite (10.7% NaOCl by weight) is added dropwise over ½ hour while holding the reaction temperature at 10°–15° C. The extent of reaction is followed by vapor phase chromatography and the reaction is complete 15 minutes after the NaOCl addition is complete. The aqueous phase is separated and the organic phase cooled to 3° C. and washed with 75 mls of cold 15% sodium bisulfite solution for 2 minutes, 75 mls of saturated sodium bicarbonate solution, dried over anhydrous sodium sulfate, filtered and weighed. The crude yield is 104.2 grams (87.9% crude yield) of a light yellow liquid. The product is stored in a vented poly bottle in a freezer. The infrared spectrum of the product is in agreement with the structure of 2-t-butylazo-2-hydroxybutane.

The above techniques are followed to prepare the hydroxyazoalkanes identified in Table 1, using the appropriate hydrazone as starting material. Yields reported are based on the weight of the hydrazone. Each hydrazone is prepared by condensing the appropriate alkyl hydrazine with the indicated "Starting Ketone." The column "Reaction Period" indicates the period required to complete oxidation. In some cases (where indicated) t-butyl alcohol or dioxane is added to the reaction mixture to speed-up the reaction.

In general, the t-aliphatic hydrazones are partially water soluble and the hypochlorite oxidation goes very smoothly at 0°–50° C. An aqueous solution of 5–15% sodium hypochlorite is slowly added to the hydrazone, controlling the temperature at −10° to 50° C. (preferably 0°–35° C.) depending on the reactivity of the hydrazone.

The mole ratio of sodium hypochlorite to hydrazone should be at least 1:1 to insure complete oxidation. Preferably it is useful to use 5 to 15% molar excesses of sodium hypochlorite. It is preferable to have as little free caustic as possible in the sodium hypochlorite in order to obtain optimum reactivity. An inert diluent, such as a low boiling hydrocarbon, ether or chlorinated hydrocarbon, such as pentane, hexane, heptane, cyclohexane, benzene, toluene, dioxane, diethyl ether, tetrahydrofuran, methylene chloride, chloroform, carbontetrachloride, or odorless mineral spirits, may be used to moderate the reaction if desired. A convenient method of determining the endpoint of the reaction is to monitor the disappearance of the hydrazone by vapor phase chromatography. When all of the hydrazone has reacted, the aqueous layer is separated, the organic layer washed with a bicarbonate solution, the organic layer is separated, dried, and stored below 0° C. The alpha-hydroxyazoalkanes of formula (I) are thermally sensitive and also extremely acid sensitive.

As the size of $R_1$ and $R_2$ increases and the hydrazone becomes less water soluble, the hypochlorite oxidation becomes more difficult due to the heterogeniuity of the reaction mixture and inert mutually miscible solvents such as dioxane or t-butyl alcohol, or higher reaction temperatures have to be employed. Where the hydrazone has low water solubility, the oxidation may be carried out neat.

While the invention has been specifically illustrated with sodium hypochlorite as the oxidizing agent, other such agents may be used. Other suitable oxidizing agents include aqueous solutions of alkali metal, and alkaline earth hypohalites such as sodium hypobromite, potassium hypochlorite, potassium hypobromite, calcium hypochlorite and calcium hypobromite. For economic reasons, ease of handling, and purity of final product, it is preferable to use aqueous solutions of sodium hypochlorite. Other water soluble mild oxidizing agents that are effective in neutral or basic media may also be used. When using aqueous sodium hypochlorite, it is preferable to carry out the oxidations at 0°–50° C, depending on the reactivity of the hydrazone, carefully controlling the exotherm with a cooling bath.

The oxidation may be carried out by adding the oxidizing agent to the hydrazo or vice versa. Sometimes it is preferable to add the hydrazo to the oxidizing agent and in other cases, the reverse is true. From a purity standpoint, it is often advantageous to run the reaction in a nitrogen atmosphere.

TABLE 1

| Example | Hydroxy Azo | Starting Ketone | Reaction Period | Oxid'n. Temp. ° C. | Crude Yield (%) |
|---|---|---|---|---|---|
| 5 | 2-t-butylazo-2-hydroxypropane | acetone | 70 mins. | 10 | 85 |
| 6 | 2-t-butylazo-2-hydroxypropane | acetone | 30 mins. | 25 | 88 |
| 7 | 2-t-butylazo-2-hydroxybutane | 2-butanone | 30 mins. | 25 | 85 |
| 8 | 2-t-butylazo-2-hydroxypentane | 2-pentanone | 2½ hrs. | 40 | 87.5 |
| 9 | 2-t-butylazo-2-hydroxypentane | 2-pentanone | 2 hrs. | 45 | 83 |
| 10 | 2-t-butylazo-2-hydroxyhexane | 2-hexanone | 4 hrs. | 45 | 82 |
| 11 | 2-t-butylazo-2-hydroxyheptane | 2-heptanone | 9 hrs. | 40 | 64 |
| 12 | 3-t-butylazo-3-hydroxyheptane | 3-heptanone | 6 hrs. | 45 | 76 |
| 13 | 2-t-butylazo-2-hydroxyoctane | 2-octanone | 5 hrs. | 45 | 87 |
| 14 | 2-isopropylazo-2-hydroxybutane | 2-butanone | 3 hrs. | 30 | 46 |
| 15* | 2-cyclohexylazo-2-hydroxybutane | 2-butanone | 3 hrs. | 30 | 55 |
| 16 | 2-sec-butylazo-2-hydroxypropane | acetone | 3 hrs. | 30 | 19 |
| 17** | 2-(1,3-dimethylbutylazo)-2-hydroxypropane | acetone | 3 hrs. | 30 | 44 |
| 18* | 2-sec-butylazo-2-hydroxybutane | 2-butanone | 3 hrs. | 30 | 31 |
| 19 | 2-t-amylazo-2-hydroxypropane | acetone | 2 hrs. | 30 | 76 |

*t-butyl alcohol added
**dioxane added

The compounds made by the process of the present invention are useful as polymerization initiators for vinyl monomers and curing and foaming agents for polymers, especially polyester resins (e.g. Canadian 924,299, 4/10/73).

As will be apparent from the specific examples identifying products which can be formed by the process of the present invention, the term "aliphatic" as applied to formulas (I) and (II) is intended to comprehend substituted and unsubstituted alkyl, aralkyl and cycloalkyl and the term "aromatic" is intended to include substituted and unsubstituted mono- and polynuclear aryl radicals. Thus, restating the definitions of R, $R_1$ and $R_2$ in formulas (I) and (II) with greater specificity for illustrative purposes, R is an alkyl, cycloalkyl, bicycloalkyl, tricycloalkyl, aralkyl, or aryl radical. Thus, R may be lower alkyl radical of 1 to 11 carbons, preferably 1 to 6 carbons, cycloalkyl, bicycloalkyl or tricycloalkyl radical of 3 to 12 carbons, preferably 3 to 8 carbons, an aralkyl radical of 7 to 12 carbons, preferably 7 to 9 carbons or aryl radical of 6 to 14 carbons, preferably 6 to 10 carbons and most preferably phenyl or substituted phenyl. In addition, the R radicals may be joined to form a cyclo, bicyclo or tricyclo radical of 3 to 12 carbons.

$R_1$ and $R_2$ are selected from: an alkyl radical of 1 to 12 carbons, preferably 1 to 6 carbons, a cycloalkyl, bicycloalkyl or tricycloalkyl radical of 3 to 12 carbon atoms, preferably 3 to 8 carbon atoms, an aralkyl radical of 7 to 12 carbon atoms, preferably 7 to 9 carbons. In addition, $R_2$ may also be an aryl or substituted aryl radical of 6 to 14 carbon atoms, preferably 6 to 10 carbon atoms and most preferably phenyl or substituted phenyl. $R_1$ and $R_2$ together may form an alkylene diradical of 3 to 11 carbon atoms, preferably 4 to 7 carbons, and one or more of each of $R_1$ and $R_2$ (or the alkylene diradical formed from $R_1$ and $R_2$) may be substituted with inert radicals selected from: lower alkoxy (lower indicating about 1 to 4 carbon atoms), aryloxy (preferably phenoxy), lower alkyl, halogen (preferably chlorine or bromine), or cyano.

*Examples of R Radicals:* Methyl, ethyl, propyl, i-propyl, butyl, i-butyl, sec-butyl, t-butyl, amyl, i-amyl, sec-amyl, t-amyl, hexyl, t-hexyl, heptyl, octyl, t-octyl, cyclopropyl, cyclobutyl, cyclopentyl, cyclohexyl, cyclooctyl, cyclododecyl, perhydronaphthyl, adamantyl, bicyclo [2.2.1] heptyl, benzyl, alpha-cumyl, 2-(beta-naphthyl)ethyl, neopentyl, phenyl, o, m, and p-toluyl, and xylyl.

*Examples of $(R)_3C$ Radicals:* t-butyl, t-amyl, t-cumyl, t-adamantyl, t-(2-methyl)bicyclo[2.2.1]heptyl, t-(2-methyl)bicyclo[2.2.2] octyl, t-octyl, t-dodecyl, t-(alpha-methyl-alpha-ethyl)benzyl, t-(alpha,alpha-diethyl)benzyl, isopropyl, sec-butyl, cyclohexyl, cyclopenlyl, and 1,3-dimethylbutyl.

*Examples of $R_1$ Radicals:* methyl, ethyl, propyl, i-propyl, butyl, i-butyl, sec-butyl, t-butyl, amyl, i-amyl, sec-amyl, t-amyl, hexyl, t-hexyl, neopentyl, 2-methoxy-2-methylpropyl, n-octyl, t-octyl, cyclopropyl, cyclobutyl, cyclopentyl, cyclohexyl, cyclooctyl, cyclododecyl, perhydronaphthyl, adamantyl, bicyclo [2.2.1] heptyl, benzyl, alpha-cumyl, alpha-methyl-alpha-ethylbenzyl, alpha, alpha-diethylbenzyl, alpha-ethyl-alpha-propylbenzyl, 1-phenylcyclohexyl, 3,3,5-trimethylcyclohexyl, 4-t-butylcyclohexyl, methylcyclohexyl, trimethylcyclopentyl and 4-i-propylcyclohexyl.

*Examples of $R_2$ Radicals:* same as $R_1$ radicals plus phenyl, o, m and p-toluyl, naphthyl, triethylphenyl, phenanthryl, p-t-butylphenyl, m and p-methoxyphenyl, o, m and p-bromo (or chloro) phenyl, xylyl, m-cyclopropylphenyl, p-cyclohexylphenyl, and i-propylphenyl.

*Examples where $R_1$ and $R_2$ are joined together:* propylene, butylene, pentamethylene, hexamethylene, heptamethylene, octamethylene, nonamethylene, undecamethylene, 1,2 or 3-methylpentamethylene.

*Examples of Substituents in $R_1$ and $R_2$:* methoxy, ethoxy, prpoxy, phenoxy, naphthoxy, chlorophenoxy, ethylphenoxy, chlorine, bromine, fluorine, and cyano.

Many equivalent modifications will become available to those skilled in the art without a departure from the inventive concept.

What is claimed is:

1. A process comprising reacting a hydrazone compound having the formula:

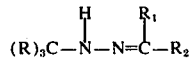

with an aqueous non-acidic solution of an oxidizing agent selected from the group consisting of alkali metal hypochlorites, alkali metal hypobromites, alkaline earth metal hypochlorites and alkaline earth metal hypobromites, thereby producing an α-hydroxyazo compound having the formula:

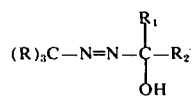

wherein in both of said formula:
   R, $R_1$ and $R_2$ independently are alkyl, cycloalkyl, bicycloalkyl, tricycloalkyl or aralkyl;
   or one R is hydrogen or aryl, or the R's are joined together to form cycloalkyl, bicycloalkyl or tricycloalkyl;
   or $R_2$ is aryl;
   or $R_1$ and $R_2$ are joined together to form alkylene; and
   $R_1$ and $R_2$ are independently unsubstituted or substituted by alkoxy, aryloxy, alkyl, fluoro, chloro, bromo or cyano.

2. The process of claim 1 wherein
   R is hydrogen, alkyl containing 1 to 11 carbon atoms, cycloalkyl containing 3 to 12 carbon atoms, bicycloalkyl containing 3 to 12 carbon atoms, tricycloalkyl containing 3 to 12 carbon atoms, aralkyl containing 7 to 12 carbon atoms, or aryl containing 6 to 14 carbon atoms; or the R's are joined to form cycloalkyl containing 3 to 12 carbon atoms, bicycloalkyl containing 3 to 12 carbon atoms, or tricycloalkyl containing 3 to 12 carbon atoms;
   $R_1$ and $R_2$ are independently selected from alkyl containing 1 to 12 carbon atoms, cycloalkyl containing 3 to 12 carbon atoms, bicycloalkyl containing 3 to 12 carbon atoms, tricylcoalkyl containing 3 to 12 carbon atoms, or aralkyl containing 7 to 12 carbon atoms; or $R_2$ is aryl containing 6 to 14 carbon atoms; or
   $R_1$ and $R_2$ are joined together to form alkylene containing 3 to 12 carbon atoms.

3. The process of claim 1 wherein the oxidizing agent is an aqueous sodium hypochlorite solution.

4. A process for preparing 2-t-butylazo-2-hydroxybutane which comprises reacting essentially equimolar amounts of 2-butanone tert.-butylhydrazone with a 5 to 15% aqueous solution of sodium hypochlorite at 10° to 30° C.

5. The process of claim 4 wherein the reaction is carried out in a nitrogen atmosphere.

* * * * *